(12) United States Patent
Mueller et al.

(10) Patent No.: US 8,984,981 B2
(45) Date of Patent: Mar. 24, 2015

(54) SINTERED GEARWHEEL

(75) Inventors: Alexander Mueller, Altmuenster (AT); Horst Roessler, Wels (AT); Christian Sandner, Gmunden (AT)

(73) Assignee: Miba Sinter Austria GmbH, Laakirchen (AT)

( * ) Notice: Subject to any disclaimer, the term of this patent is extended or adjusted under 35 U.S.C. 154(b) by 259 days.

(21) Appl. No.: 13/575,683

(22) PCT Filed: Jul. 1, 2011

(86) PCT No.: PCT/AT2011/000289
§ 371 (c)(1),
(2), (4) Date: Jul. 27, 2012

(87) PCT Pub. No.: WO2012/027761
PCT Pub. Date: Mar. 8, 2012

(65) Prior Publication Data
US 2013/0008278 A1  Jan. 10, 2013

(30) Foreign Application Priority Data

Aug. 31, 2010 (AT) ................................ A 1454/2010

(51) Int. Cl.
| F16H 55/06 | (2006.01) |
| B22F 5/08 | (2006.01) |
| B21H 5/02 | (2006.01) |
| B22F 3/11 | (2006.01) |
| B22F 3/16 | (2006.01) |

(52) U.S. Cl.
CPC B22F 5/08 (2013.01); B21H 5/022 (2013.01); B22F 3/1109 (2013.01); B22F 3/168 (2013.01); F16H 55/06 (2013.01)
USPC .............................................. 74/457; 74/460

(58) Field of Classification Search
USPC .......... 74/457, 460, 468; 428/602, 613, 304.4
See application file for complete search history.

(56) References Cited

U.S. PATENT DOCUMENTS

| 4,708,912 | A | * | 11/1987 | Huppmann | 428/547 |
| 4,966,626 | A | * | 10/1990 | Fujiki et al. | 75/238 |
| 5,884,527 | A | * | 3/1999 | Cole et al. | 74/434 |
| 6,730,263 | B2 | * | 5/2004 | Ernst et al. | 419/6 |
| 7,556,864 | B2 | * | 7/2009 | Yamanishi et al. | 428/602 |
| 7,698,964 | B2 | * | 4/2010 | Kashimura | 74/461 |
| 8,307,551 | B2 | * | 11/2012 | Kotthoff | 29/893.3 |
| 8,340,806 | B2 | * | 12/2012 | Kotthoff et al. | 700/148 |

(Continued)

FOREIGN PATENT DOCUMENTS

| DE | 10 2005 027 140 | 12/2006 |
| EP | 0 552 272 | 7/1993 |
| EP | 1 552 895 | 7/2005 |
| WO | WO 2009/025660 | 2/2009 |

OTHER PUBLICATIONS

International Search Report of PCT/AT2011/000289, Sep. 23, 2011.

*Primary Examiner* — David M Fenstermacher
(74) *Attorney, Agent, or Firm* — Collard & Roe, P.C.

(57) ABSTRACT

A sintered gearwheel is described having teeth (1) which, in the flank and root region (2, 3), comprise a compacted surface layer (7, 8, 9) which is continuous in the transition portion (4) between the flank and root region (2, 3) and has a residual porosity of less than 10%. In order to increase the load-bearing capacity it is proposed that the compacted surface layer (9) is formed with a lower thickness in the transitional portion (4) between the flank and root region (2, 3) than in the adjacent flank and root regions (2, 3).

2 Claims, 1 Drawing Sheet

(56) References Cited

U.S. PATENT DOCUMENTS

| | | | |
|---|---|---|---|
| 8,402,659 B2* | 3/2013 | Kotthoff | 29/893.32 |
| 2003/0155041 A1* | 8/2003 | Bengtsson et al. | 148/208 |
| 2005/0272545 A1* | 12/2005 | Yamanishi et al. | 474/152 |
| 2009/0317582 A1* | 12/2009 | Schmid et al. | 428/66.1 |
| 2013/0008278 A1* | 1/2013 | Mueller et al. | 74/457 |

* cited by examiner

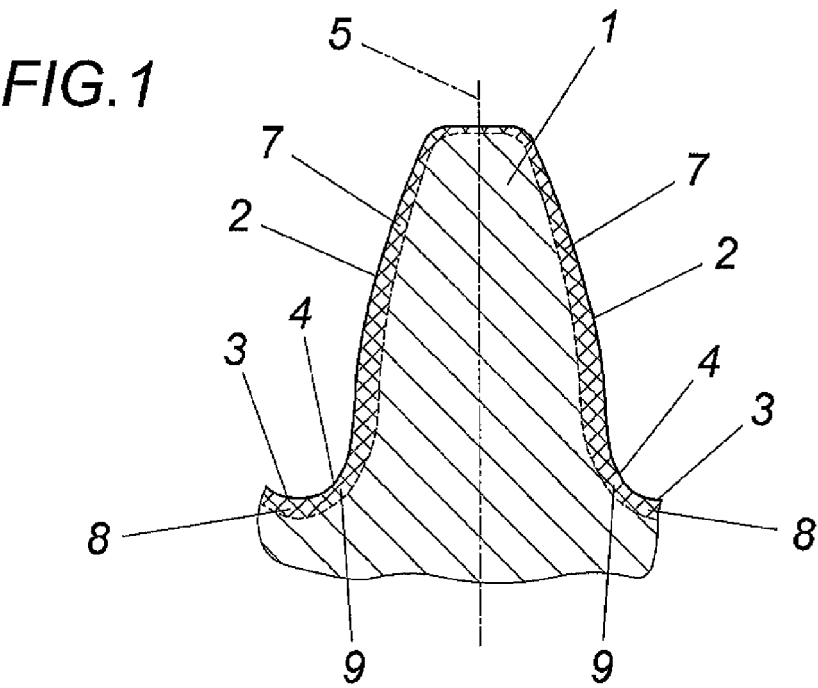
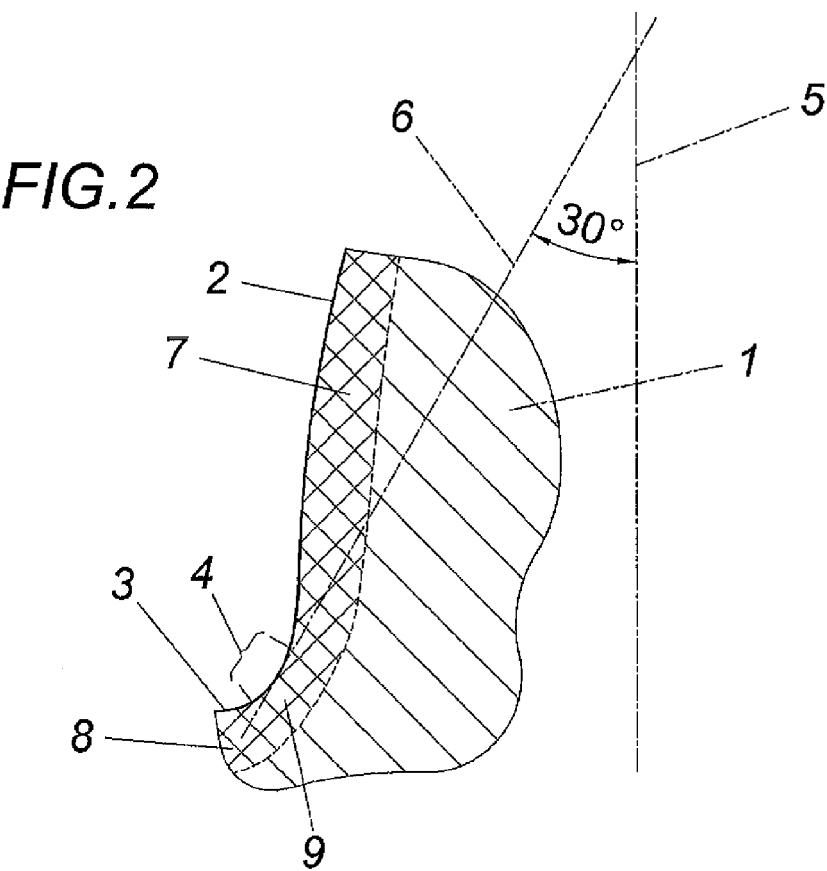

SINTERED GEARWHEEL

CROSS REFERENCE TO RELATED APPLICATIONS

This application is the National Stage of PCT/AT2011/000289 filed on Jul. 1, 2011, which claims priority under 35 U.S.C. §119 of Austrian Application No. A 1454/2010 filed on Aug. 31, 2010, the disclosure of which is incorporated by reference. The international application under PCT article 21(2) was not published in English.

FIELD OF THE INVENTION

The invention relates to a sintered gearwheel having teeth which, in the flank and root region, comprise a compacted surface layer which is continuous in the transition portion between the flank and root region and has a residual porosity of less than 10%.

DESCRIPTION OF THE PRIOR ART

In order to achieve a higher bending endurance in the region of the tooth roots and a higher wear resistance in the region of the tooth flanks in sintered gearwheels produced by means of powder metallurgy, it is known (EP 0 552 272 B1) to densify the sintered powder metal blanks of the gearwheels in the flank and root region of the teeth, so that a substantially pore-free surface layer is obtained which leads in the meshing region of the gearwheel to a considerable increase in the permissible load-bearing capacity. It is known in this connection (U.S. Pat. No. 5,884,527 A) to arrange the compacted surface layer having a residual porosity of not more than 10% with a thickness of 380 to 1000 µm. It has also been proposed (U.S. Pat. No. 7,556,864 B2) to provide the compacted surface layer in the flank and root region of the teeth with different thicknesses. The occurring loads shall be met and reduction in noise shall be achieved with a compacted surface layer in the flank region of between 500 and 1000 µm which continuously converges into a compacted surface layer with a thickness of 10 to 300 µm in the root region of the teeth.

Mutually meshing gearwheels are stressed by bending as a result of the power transmission in the root region of the teeth, with the highest tensions occurring in the transitional portion between the root and flank region and reaching their maximum on the surface of the teeth. In order to enable absorbing these bending stresses under larger loads, a compacted surface layer of sufficient thickness was used in the transitional region between the flank and the root region. It has been noticed in practice however that despite a larger surface layer in the region of the largest bending stresses the likelihood of material overload cannot be excluded.

SUMMARY OF THE INVENTION

The invention is therefore based on the object of providing a sintered gearwheel of the kind mentioned above in such a way that its load-bearing capacity can be increased considerably.

This object is achieved by the invention in such a way that the compacted surface layer is formed with a lower thickness in the transitional portion between the flank and root region than in the adjacent flank and root regions.

Powder metal blanks are sintered with an oversize corresponding to the surface layer to be compacted for the production of sintered gearwheels with teeth which have a compacted surface layer in the flank and root region. They are calibrated to the nominal size under compaction of the surface layer in the region of the oversize by means of a pressing tool which forms a counter-toothing. During the rolling engagement of the counter-toothing of the pressing tool into the toothing of the sintered powder metal blank, a penetration of the tips of the teeth of the counter-toothing of the pressing tool into the sintered powder metal blank will occur predominantly in the transitional portion between the flank and root region of the teeth, leading to a very high degree of deformation which may lead to material defects such as flaking and lapping of the material. As a result of a reduction in the thickness of the oversize of the sintered powder metal blank in the transitional region between the flank and root region of the teeth, the degree of deformation caused by processing with the pressing tool can be reduced to a level which does not lead to any flaking or lapping of the material which might impair the load-bearing capacity of the compacted material. For this reason, a reduced thickness of the compacted surface layer in the transitional region between the flank and the root region leads to a considerable increase in the load-bearing capacity of the sintered gearwheel in combination with good root-strength of the teeth.

Especially advantageous constructional conditions are obtained when the thickness of the compacted surface layer in the transitional region between the flank and the root region is not more than 280 µm, because in this case damage to the material during the surface-compacting calibrating process by the rolling engagement of the counter-toothing of the pressure tool in the toothing of the sintered powder metal blank can be excluded to a substantial extent.

BRIEF DESCRIPTION OF THE DRAWING

The subject matter of the invention will be shown by way of example in the drawings, wherein:

FIG. 1 shows sections of a sintered gearwheel in accordance with the invention in the region of a tooth in a schematic, axially normal sectional view, and FIG. 2 shows this tooth in sections on an enlarged scale in the transitional portion from the flank region to the root region.

DESCRIPTION OF THE PREFERRED EMBODIMENT

The tooth 1 of a sintered gearwheel (not shown in closer detail) forms a tooth flank region 2 and a root region 3 in a conventional manner. The transitional portion between these two regions 2 and 3 is designated with reference numeral 4 and is generally determined by tangent 6 on the contour of tooth 1, which tangent 5 is inclined under 30° in relation to the tooth axis 5, as is shown in FIG. 2.

A compacted surface layer is provided in the flank and root region 2, 3 of the tooth 1, which compacted surface layer is designated in the tooth flank region with reference numeral 7 and in the tooth root region with reference numeral 8, with a surface layer 9 being obtained in the transitional region 4 which converges continually into the surface layers 7, 8. Said compacted surface layers 7, 8 and 9 have a residual porosity of less than 10% which decreases towards the surface of the tooth, so that a substantially dense material can be expected in the direct surface region. The compacted surface layer 9 in the region of the transitional portion 4 has a lower thickness in comparison with the compacted surface layers 7 and 8 of the flank and root region 2, 3, which thickness is less than 280 µm. The thickness of the compacted surface layer 8 in the root region 3 preferably lies over 350 µm. The compacted surface layer 7 in the flank region 2 can be arranged in the known manner with a thickness of between 500 and 1000 μm, but also with a higher thickness.

The invention claimed is:

1. A sintered gearwheel having teeth which, in the flank and root region, comprise a compacted surface layer which is continuous in the transition portion between the flank and root region and has a residual porosity of less than 10%, wherein the compacted surface layer is formed with a lower thickness in the transitional portion between the flank and root region than in the adjacent flank and root regions.

2. A sintered gearwheel according to claim 1, wherein the thickness of the compacted surface layer in the transitional portion between the flank and the root region is not more than 280 μm.

* * * * *